(12) United States Patent
Guarneri

(10) Patent No.: US 6,347,641 B2
(45) Date of Patent: *Feb. 19, 2002

(54) GAS PRESSURE-REGULATING DEVICE FOR DISPENSING WORKING FLUID

(75) Inventor: Georges Guarneri, Le Pont de Claix (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/771,720

(22) Filed: Jan. 30, 2001

Related U.S. Application Data

(63) Continuation of application No. 09/354,575, filed on Jul. 16, 1999, now Pat. No. 6,209,568.

(30) Foreign Application Priority Data

Jul. 17, 1998 (FR) ............................................. 98 09133

(51) Int. Cl.[7] ................................................ F16K 17/18
(52) U.S. Cl. .................................... 137/209; 137/493.9
(58) Field of Search ............................... 137/209, 493.9

(56) References Cited

U.S. PATENT DOCUMENTS

| | | | |
|---|---|---|---|
| 1,628,069 A | * 5/1927 | Schmidt et al. | 137/493.9 X |
| 3,380,462 A | * 4/1968 | Schieber et al. | 137/209 X |
| 3,548,847 A | * 12/1970 | Roven | 137/202 X |
| 3,768,498 A | * 10/1973 | Urban | 137/202 X |
| 3,814,123 A | * 6/1974 | Cook | 137/493.9 |
| 4,266,568 A | 5/1981 | Kuykendall | |
| 4,859,375 A | 8/1989 | Lipisko et al. | |
| 5,356,045 A | 10/1994 | Parks et al. | |
| 5,623,958 A | 4/1997 | Bumpers | |
| 6,209,568 B1 | * 4/2001 | Guarneri | 137/209 |

FOREIGN PATENT DOCUMENTS

| | | |
|---|---|---|
| FR | 2 239 630 | 2/1975 |
| FR | 2 501 326 A | 9/1982 |
| FR | 2 560 340 | 8/1985 |
| FR | 2 756 466 | 6/1998 |
| WO | WO 94/13988 | 6/1994 |

OTHER PUBLICATIONS

U.S. Patent application Ser. No. 09/354,575.

* cited by examiner

Primary Examiner—Gerald A. Michalsky
(74) Attorney, Agent, or Firm—Burns, Doane, Swecker & Mathis, L.L.P.

(57) ABSTRACT

A system for providing gas to a container includes a source of gas under pressure, a container, and a pressure regulating device. The pressure-regulating device includes an inlet intended to be connected to a source of the gas under pressure, an outlet, connected by a duct to the inlet and intended to be placed in communication with the container, a first valve for limiting the pressure at the outlet to a predetermined maximum value Ps, which valve is a delivery valve placed in a first passage which connects the duct to an orifice for discharging inert gas. The device also includes a second valve for keeping the pressure at the outlet above a predetermined minimum value Pi, which valve is an intake valve placed in a second passage which connects the duct to an orifice that lets fluid into this duct.

18 Claims, 2 Drawing Sheets

GAS PRESSURE-REGULATING DEVICE FOR DISPENSING WORKING FLUID

This application is a continuation of application Ser. No. 09/354,575, filed Jul. 16, 1999, now U.S. Pat. No. 6,209,568, which is incorporated by reference herein.

BACKGROUND OF THE INVENTION

1. Field of the Invention

The present invention relates to a pressure-regulating device for supplying a gas to a container, comprising an inlet intended to be connected to a source of the said gas under pressure, an outlet, connected by a duct to the said inlet and intended to be placed in communication with the container, a first valve for limiting the pressure at the said outlet to a predetermined maximum value Ps, which valve is a delivery valve placed in a first passage which connects the said duct to an orifice for discharging inert gas.

The invention applies in particular to the supply of working liquids in the electronics industry.

2. Description of the Related Art

The electronics industry, particularly the microelectronics industry, involves the use of ultrapure working liquids such as $H_2O_2$, HCl, $H_2S$, etc., for example.

Such liquids are generally held in storage containers, the structure of which makes it possible to prevent these liquids from becoming contaminated, especially through the presence of particularly expensive and delicate internal coatings, for example perfluoroalkoxy coatings (PFA).

The delicate nature of these internal coatings considerably limits, inside these containers, the permissible variations in pressure about atmospheric pressure to which these containers are subjected externally.

Thus, the gauge pressure inside these containers must, for example, be between −20 and +150 mbars.

In order to observe this constraint and avoid the contamination of the working liquids that are to be dispensed, the vacuum created in such a container when working liquid is drawn off is filled by the supply of corresponding amounts of an ultrapure inert gas, typically nitrogen.

Nitrogen is generally supplied to a container for the storage of working liquid by a supply system which comprises a pressure-regulating device, means of connecting an inlet of the device to a source of inert gas under pressure, these means being equipped with means of expanding the gas to a datum pressure Pc that lies in the range of pressures which are permissible inside the container, and a pipe for placing an outlet of the device in communication with the storage container. The pressure-regulating device is intended to prevent damage to the storage container in the event of an operating incident.

Until now, there have been two types of pressure-regulating device.

In the first type, the device comprises a permanent communication with the ambient atmosphere of the duct connecting the inlet and the outlet of the regulating device, through a calibrated vent. Although this type of device provides the storage containers with good protection against variations in internal gauge pressure, it does, however, entail constant consumption of ultrapure nitrogen, whether or not working liquid is being dispensed, and this leads to high running costs.

In the second type, the pressure-regulating device comprises a delivery valve with a valve element balanced by a spring, to place the duct of the regulating device in communication with the ambient atmosphere. A device of this kind exhibits numerous drawbacks. Specifically, it does not safeguard the containers, on the one hand, against any depression and, on the other hand, in case of substantial overpressure upstream of the regulating device, because of the low delivery rates allowed by these clack-type valves. Furthermore, this type of device entails regular checks on the settings of the clack valve and of the expansion means, which are dependent on one another. Finally, as the use of metal components in such regulating devices is forbidden in order to maintain the purity of the inert gases, this type of device is complex and expensive to produce.

The object of the invention is to solve these problems by providing a simple pressure-regulating device of low manufacturing and running costs and which is able to safeguard storage containers when dispensing ultrapure working liquids.

SUMMARY OF THE INVENTION

To this end, the subject of the invention is a pressure-regulating device for supplying a gas to a container, comprising an inlet intended to be connected to a source of the said gas under pressure, an outlet, connected by a duct to the said inlet and intended to be placed in communication with the container, a first valve for limiting the pressure at the said outlet to a predetermined maximum value Ps, which valve is a delivery valve placed in a first passage which connects the said duct to an orifice for discharging inert gas, characterized in that the device also comprises a second valve for keeping the pressure at the said outlet above a predetermined minimum value Pi, which valve is an intake valve placed in a second passage which connects the said duct to an orifice that lets fluid into this duct.

According to particular embodiments, the device may have one or more of the following features, taken in isolation or in any technically feasible combination:

- the first valve comprises a first shutter which can move between a lower shut-off position and an upper flow, position, under the action of a positive difference $P^+$ between the pressures in part of the duct and at the said discharge orifice, acting against the action of the self weight of the first shutter, the said shutter being of a mass carefully determined to balance the action of a predetermined pressure difference $P^+c$;
- the first shutter is placed on a seat intended to be substantially horizontal;
- the discharge orifice is an orifice for communicating with the ambient atmosphere at pressure Pa, and $P^+c=Ps-Pa$;
- the second valve comprises a second shutter which can move between a lower shut-off position and an upper flow position under the action of a negative difference $P^-$ between the pressures in part of the duct and at the intake orifice, acting against the action of the self weight of the second shutter, the shutter being of a mass carefully determined to balance the action of a predetermined negative pressure difference $P^-c$;
- the second shutter is placed on a seat intended to be substantially horizontal;
- the intake orifice is an orifice for communicating with the ambient atmosphere at pressure Pa, and $P^-c=Pi-Pa$.

Another subject of the invention is a system for supplying inert gas to a container, comprising a pressure-regulating device, means of connecting an inlet of the device to a source of the gas under pressure, and a pipe for placing an outlet of the device in communication with the container, characterized in that the pressure-regulating device is a device as defined hereinabove.

In an alternative form, the connecting means comprise means of expanding the inert gas to a datum pressure Pc which lies approximately between Pi and Ps, and preferably close to Ps.

A final subject of the invention is an installation for dispensing a working liquid, comprising a container for storing the working liquid, means of dispensing the working liquid which are connected to the container, a system for supplying gas, especially inert gas, to the container (4), and a source of the gas under pressure, the supply system being connected to the source and to the container so as to fill in the latter a vacuum produced as a result of the withdrawing of the liquid, characterized in that the gas-supply system is a system as defined hereinabove.

BRIEF DESCRIPTION OF THE FIGURES OF THE DRAWING

The invention will be better understood from reading the description which will follow, given merely by way of example and made with reference to the appended drawings, in which.

DETAILED DESCRIPTION OF THE PREFERRED EMBODIMENTS

Figure 1:
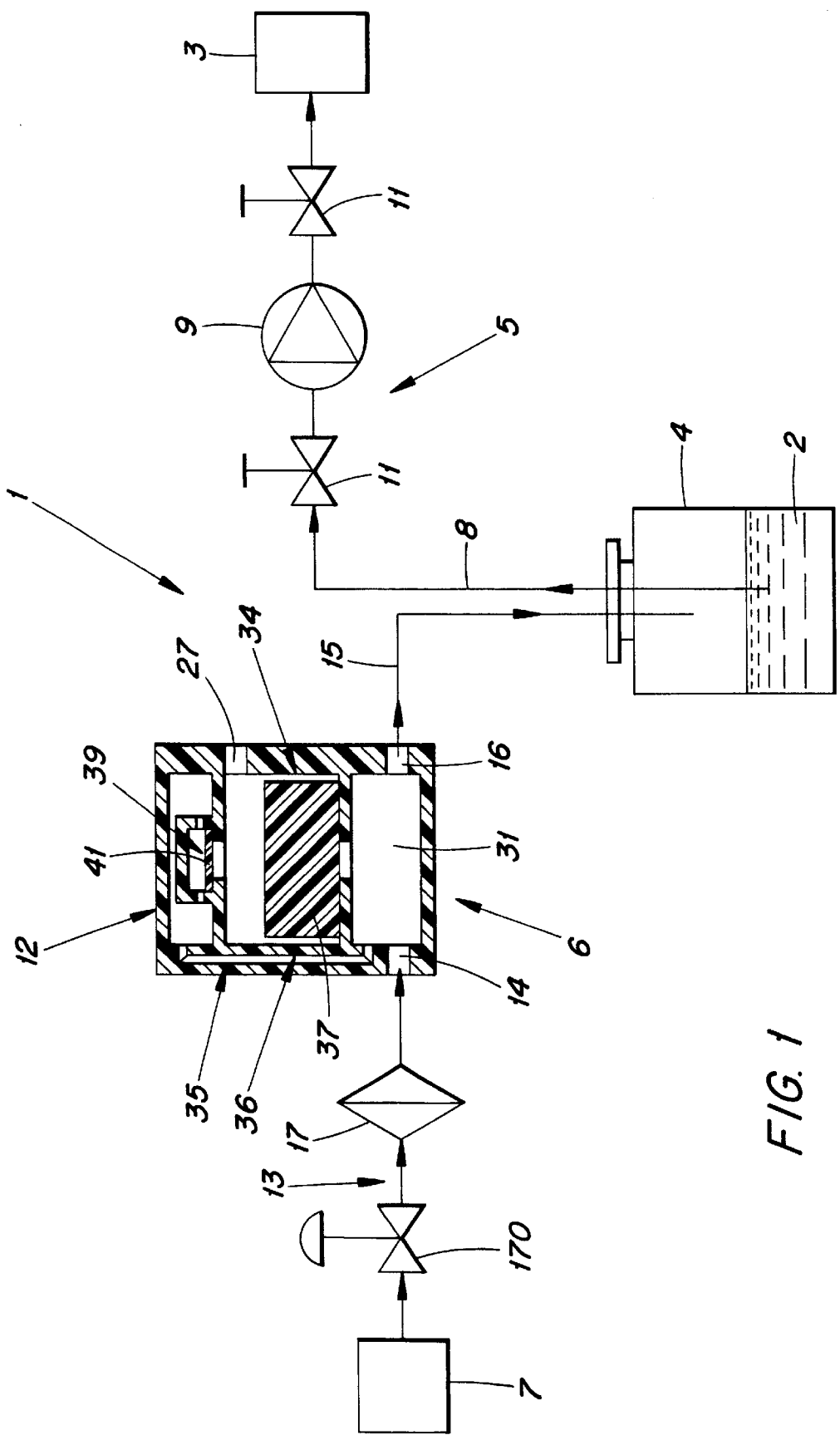
FIG. 1 is a diagrammatic side view in part section of an installation for dispensing working liquid according to the invention.

FIG. 1 depicts an installation 1 for dispensing an ultrapure working liquid 2 to a consumer unit 3 of an industrial site, for example a microelectronics site.

This installation 1 essentially comprises a container 4 for storing the liquid 2, means 5 for dispensing the liquid 2, a system 6 for delivering inert gas to the container 4 and a source 7 of gaseous ultrapure nitrogen at 10 bar absolute.

The container 4 is internally coated with a layer of PFA (not depicted) which means that the gauge pressure inside this container 4 must lie between −20 mbar and +150 mbar.

The dispensing means 5 comprise a pipe 8 immersed in the liquid 2 contained in the container 4 and equipped with a pump 9 placed between two manual shut-off valves 11.

The system 6 for supplying ultrapure nitrogen essentially comprises a pressure-regulating device 12, means 13 of connecting an inlet 14 of the device 12 to the source 7, and a pipe 15 for placing an outlet 16 of the device 12 in communication with the upper part of the container 4.

The connecting means 13 comprise, in succession, in the direction in which the nitrogen flows, an expansion valve 170 and a stop and non-return valve 17.

The pump 9 is rated to be able to supply an appropriate maximum flow rate of working liquid 2.

The expansion valve 170 is rated and adjusted to expand the nitrogen from the source 7 as far as a datum pressure Pc corresponding to a gauge pressure of close to 40 mbar, and to supply a sufficient flow rate of nitrogen to compensate for the flow rate of the pump 9 irrespective of its speed.

The pressure-regulating device 12 comprises (FIG. 2) a first substantially parallelepipedal external box 18 placed with its lower 19 and upper 20 faces substantially horizontal.

The inlet 14 and the outlet 16 of the device 12 are calibrated orifices of appropriate cross section, each formed facing the other in lower parts of opposite side faces 22 and 23 of the box 18.

The device 12 also comprises walls placed inside the box 18. These walls form, on the one hand, a second substantially parallelepipedal box 24, one side face of which is formed by part of the wall 23 of the first box 18, and the other faces of which are placed some distance away from and substantially parallel to the other faces of the box 18. The walls form, on the other hand, a third substantially parallelepipedal box 25, smaller in size than the second box 24. The lower face of this third box is formed by part of the upper face 26 of the second box 24, and its other faces are arranged some distance away from and substantially parallel to the corresponding faces of the first box 18.

The side face 23 of the first box 18 is also pierced, in an upper part, with a calibrated orifice 27 of appropriate cross section, placing the inside of the second box 24 in communication with the ambient atmosphere.

The lower face 28 of the second box 24 is pierced with a calibrated orifice 29 placing the inside of the second box 24 in communication with the rest of the first box 18.

The upper face 26 of the second box 24 is pierced with a calibrated orifice 30 placing the inside of the third box 25 in communication with the inside of the second box 24.

The lower faces 19 of the box 18 and 28 of the box 24 delimit between them a duct 31 connecting the inlet 14 to the outlet 16 of the device 12.

Side faces of the third box 25 are pierced with orifices 32 placing the inside of the third box 25, and therefore the inside of the second box 24 via the orifice 30, in communication with the rest of the inside of the first box 18.

The three boxes 18, 24 and 25 delimit, on the one hand, a first passage 34 connecting the orifice 27 to the duct 31 via the orifice 29 and, on the other hand, a second passage 35, delimited in part between the side face 22 of the second box 24 and the adjacent side face of the first box 18, which connects the orifice 30 to the duct 31 via orifices 32 pierced in the side faces of the third box 35.

The first passage 34 is equipped with a clack-type delivery valve 36, that is to say a valve with a shutter that can move substantially at right-angles to the seat. The seat consists of the lower face 28 of the second box 24, and the shutter, that is to say the clack-valve element, is a substantially parallelepipedal block 34 capable of moving in the box 24. This block 37 is of carefully determined mass and is placed on the face 28.

The mass of the block 37 is carefully determined to balance the action thereon of a gauge pressure $P^+c$ of about 40 mbar (corresponding to a maximum absolute pressure Ps) at the orifice 29 of the duct 31.

The block 37 is guided by the side walls of the box 24 and can move vertically between a lower position in which it shuts off the orifice 29 (FIG. 2), in which position the block 37 rests on the face 28, and an upper position in which there is flow through the orifice 29 (FIG. 3), in which position the block 37 is raised off the face 28.

The second passage 35 is equipped with a clack-type intake valve 39, the seat of which consists of part of the upper face 26 of the second box 24 and the shutter, that is to say the clack-type valve element, of which is a substantially rectangular plate 41 able to move in the third box 25. This plate 41 is of carefully determined mass and placed on the face 26.

The mass of the plate 41 is carefully determined to balance the action thereon of a gauge pressure P⁻c of about −5 mbar (corresponding to a minimum absolute pressure Pi) in part of the duct 31.

Figure 4:
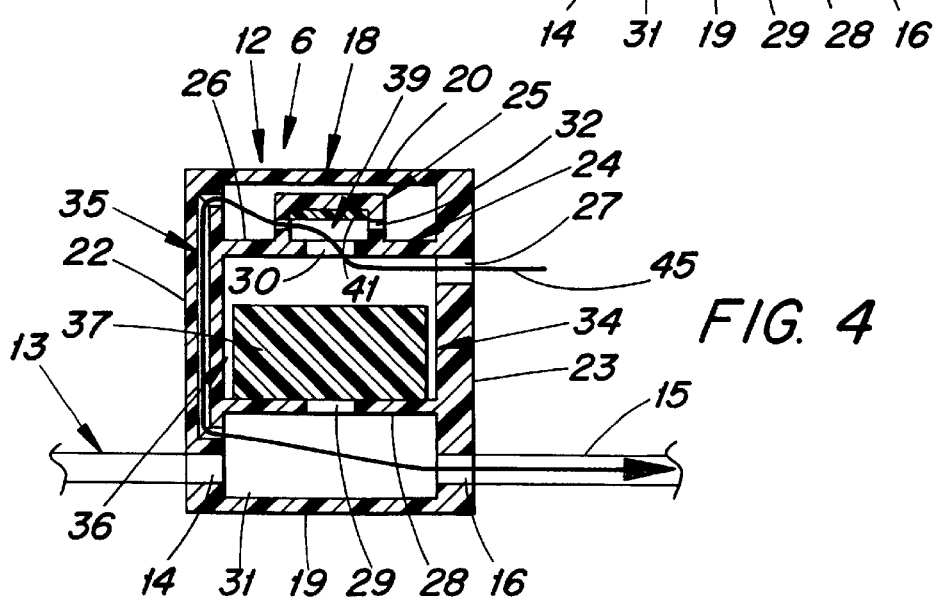

This plate 41 is guided by the side walls of the box 25 and can move vertically between a lower position in which it shuts off the orifice 30 (FIG. 2), in which position the plate 41 rests on the face 26, and an upper position for flow through the orifice 30, in which position the plate 41 is raised off the face 26 of the second box 24 (FIG. 4).

The pressure-regulating device 12 is made of plastic such as polypropylene and/or polyethylene.

The dispensing means 5 allow liquid 2 to be pumped from the container 4 to be dispensed to the consumer installation 3. The supply system 6 allows ultrapure nitrogen to be supplied to the container 4 to fill the vacuum created therein as a result of the dispensing of the liquid 2.

Figure 2:
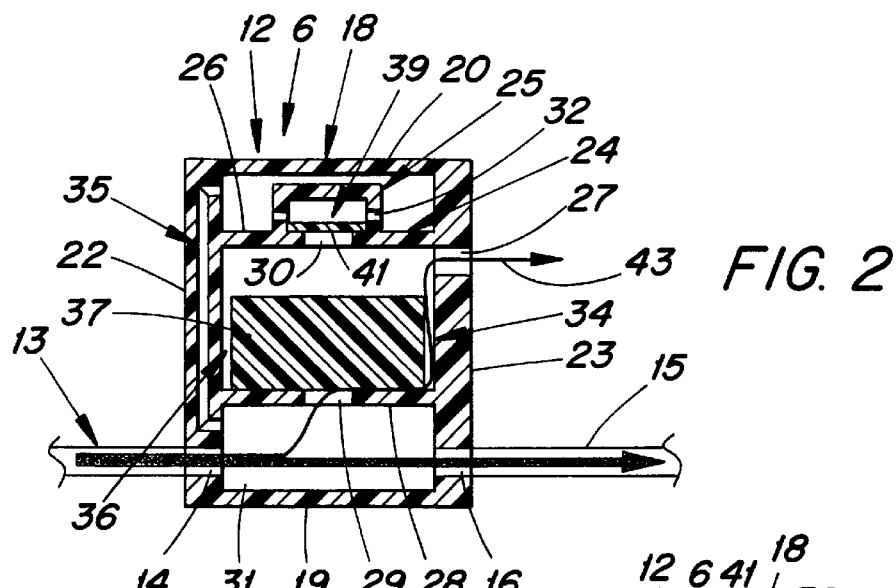
FIGS. 2 to 4 are sectioned and enlarged side views of the pressure-regulating device of the installation of FIG. 1, each illustrating the operation of this regulating device under different conditions.

FIG. 2 illustrates the way in which the pressure-regulating device 12 operates when the gauge pressure at the inlet 14, the outlet 16 and therefore in the container 4 is between P⁻c and P⁺c.

The shutters 37 and 41 are in the shut-off position and thus form an almost perfect seal between the inlet 14 and the outlet 16. Only a nitrogen leakage flow rate, depicted by the arrow 43, flows through the orifice 29 between the walls of the box 24 and the block 37, and thus makes it possible to prevent any vapour of the liquid 2 from returning towards the expansion means 170 when the pump 9 is not running.

Figure 3:
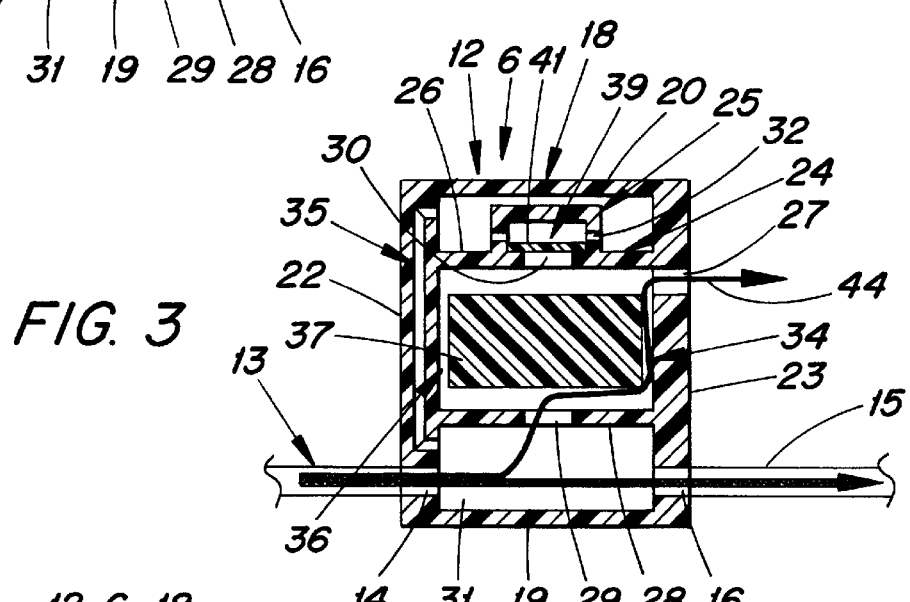

FIG. 3 illustrates the way in which the device 12 operates when the pressure at the inlet 14 is above P⁺c, for example in the event of defective operation of the expansion means 170.

The shutter 37 is then in the raised, flow, position, and the shutter 41 is in the shut-off position. The overpressure with respect to P⁺c at the inlet 14 of the device 12 is then discharged, via the first conduit 34, to the ambient atmosphere, as depicted diagrammatically by the arrow 44. The pressure at the outlet 16, and therefore inside the container 4, is thus kept below its maximum permissible value, even when the pressure at the inlet 14 is 10 bar absolute, because of the delivery through the orifice 27.

FIG. 4 illustrates the operation of the device 12 when the gauge pressure in part of the duct 31 is below P⁻c, for example when the flow rate of nitrogen supplied by the device 12 is not high enough to compensate for the flow rate at which liquid 2 is drawn off. The shutter 37 is then in the shut-off position and the shutter 41 is then in the raised, flow, position. Air is therefore taken in from the ambient atmosphere towards the outlet 16 and therefore towards the container 4 via the second passage 35, as depicted diagrammatically by the arrow 45. Thus, the pressure inside the container 4 remains above its minimum permissible value even with zero pressure at the inlet 14. The liquid 2 therefore becomes contaminated, but the integrity of the container is preserved.

The pressure-regulating device 12 according to the invention therefore makes it possible, in complete safety, to supply inert gas to a storage container 4 of an installation 1 for supplying working liquid. The consumption of nitrogen, or more generally of inert gas, is, in practice, minimal and automatically tailored to the speed of the pump 9.

Furthermore, the particularly simple structure of this device means that it can be made entirely out of materials which are well suited to preserving the purity of the inert gas used and of the working liquids dispensed.

Finally, this device has no adjustment controls, which makes it simple to use, and the limited number of moving parts means that it suffers practically no wear over time.

What is claimed is:

1. A pressure-regulating device useful for supplying a gas to a container, comprising:
    an inlet for placement in fluid communication with a source of the gas under pressure;
    an outlet for placement in fluid communication with the container;
    a duct connecting the outlet to the inlet for placement in fluid communication with the container;
    an orifice for discharging fluid from the device and permitting fluid to enter the device;
    a first passage fluidly connecting the duct with the orifice;
    a second passage fluidly connecting the duct with the orifice;
    a first valve limiting the pressure at the outlet to a predetermined maximum value Ps when the inlet is fluidly connected to a source of gas under pressure, the first valve being a delivery valve placed in the first passage; and
    a second valve maintaining the pressure at the outlet above a predetermined minimum value Pi when the outlet is fluidly connected to a container, the second valve being an intake valve placed in the second passage;
    wherein the first valve is configured with an almost perfect seal to permit a leak flow past the first valve to assist in preventing backflow from the outlet from passing out the inlet.

2. The device according to claim 1, wherein the first valve comprises a first shutter having a weight and which can move between a lower shut-off position and an upper flow position, under the action of a positive difference P⁺ between the pressures in part of the duct and at the discharge orifice, acting against the action of the first shutter, the first shutter being of a mass selected to balance the action of a predetermined pressure difference P⁺c.

3. The device according to claim 2, wherein the first shutter is positioned on a seat intended to be substantially horizontal.

4. The device according to claim 2, wherein the discharge orifice is an orifice communicating with the ambient atmosphere at pressure Pa, and in that P⁺c=Ps−Pa.

5. The device according to claim 1, wherein the second valve comprises a second shutter having a weight and which can move between a lower shut-off position and an upper flow position under the action of a negative difference P⁻ between the pressures in part of the duct and at the intake orifice, acting against the action of the second shutter, the second shutter being of a mass selected to balance the action of a predetermined negative pressure difference P⁻c.

6. The device according to claim 5, wherein the second shutter is positioned on a seat intended to be substantially horizontal.

7. The device of claim 5, wherein the intake orifice is an orifice communicating with the ambient atmosphere at pressure Pa, and in that P⁻c=Pi−Pa.

8. The device of claim 1, further comprising means for connecting the inlet of the pressure-regulating device to the source of gas under pressure, and a pipe for placing the outlet of the pressure-regulating device in communication with the container.

9. The device of claim 8, wherein the connecting means comprises a means for expanding a gas to a datum pressure Pc which lies approximately between Pi and Ps disposed in the connecting means between the inlet of the pressure-regulating device and the source of gas under pressure.

10. A pressure-regulating device useful for supplying a gas to a container, comprising:
   an inlet for placement in fluid communication with a source of the gas under pressure;
   an outlet for placement in fluid communication with the container;
   a duct connecting the outlet to the inlet for placement in fluid communication with the container;
   an orifice for discharging fluid from the device and permitting fluid to enter the device;
   a first passage fluidly connecting the duct with the orifice;
   a second passage fluidly connecting the duct with the orifice;
   a first valve limiting the pressure at the outlet to a predetermined maximum value Ps when the inlet is fluidly connected to a source of gas under pressure, the first valve being a delivery valve placed in the first passage; and
   a second valve maintaining the pressure at the outlet above a predetermined minimum value Pi when the outlet is fluidly connected to a container, the second valve being an intake valve placed in the second passage;
   wherein the first valve, the second valve, or both comprises a free floating block and a valve face including a valve orifice.

11. The device according to claim 10, wherein the first valve comprises a first shutter having a weight and which can move between a lower shut-off position and an upper flow position, under the action of a positive difference $P^+$ between the pressures in part of the duct and at the discharge orifice, acting against the action of the first shutter, the first shutter being of a mass selected to balance the action of a predetermined pressure difference $P^+c$.

12. The device according to claim 11, wherein the first shutter is positioned on a seat intended to be substantially horizontal.

13. The device according to claim 11, wherein the discharge orifice is an orifice communicating with the ambient atmosphere at pressure Pa, and in that $P^+c=Ps-Pa$.

14. The device according to claim 10, wherein the second valve comprises a second shutter having a weight and which can move between a lower shut-off position and an upper flow position under the action of a negative difference $P^-$ between the pressures in part of the duct and at the intake orifice, acting against the action of the second shutter, the second shutter being of a mass selected to balance the action of a predetermined negative pressure difference $P^-c$.

15. The device according to claim 14, wherein the second shutter is positioned on a seat intended to be substantially horizontal.

16. The device of claim 14, wherein the intake orifice is an orifice communicating with the ambient atmosphere at pressure Pa, and in that $P^-c=Pi-Pa$.

17. The device of claim 10, further comprising means for connecting the inlet of the pressure-regulating device to the source of gas under pressure, and a pipe for placing the outlet of the pressure-regulating device in communication with the container.

18. The device of claim 17, wherein the connecting means comprises a means for expanding a gas to a datum pressure Pc which lies approximately between Pi and Ps disposed in the connecting means between the inlet of the pressure-regulating device and the source of gas under pressure.

* * * * *